United States Patent [19]

Tsolkas

[11] Patent Number: 4,586,532

[45] Date of Patent: May 6, 1986

[54] LIQUID LEVEL ACTUATOR

[76] Inventor: Ilias Tsolkas, 2813 Longview Dr., Clearwater, Fla. 33519

[21] Appl. No.: 760,966

[22] Filed: Jul. 31, 1985

[51] Int. Cl.$^4$ .................... F16K 31/18; F16K 33/00
[52] U.S. Cl. .................................... 137/426; 4/508; 119/79; 137/448
[58] Field of Search .................. 4/391, 395, 403, 508; 119/78, 79; 137/426, 434, 448

[56] References Cited

U.S. PATENT DOCUMENTS

| | | | |
|---|---|---|---|
| 958,528 | 5/1910 | Pereboom | 137/409 |
| 2,088,316 | 7/1937 | Alvarez | 137/409 |
| 2,242,693 | 5/1941 | Benson | 137/409 |
| 2,570,375 | 10/1951 | Pritchard | 137/409 |
| 2,835,270 | 5/1958 | York et al. | 137/412 |
| 2,842,158 | 7/1958 | Robinson | 4/508 |
| 3,157,160 | 11/1964 | Osier | 119/79 |
| 3,176,707 | 4/1965 | Wilson | 137/448 |
| 3,310,065 | 3/1967 | Godshalk | 137/426 |
| 3,908,206 | 9/1975 | Grewing | 4/172.17 |
| 3,974,654 | 8/1976 | Mirto, Jr. | 61/17 |

Primary Examiner—G. L. Walton

[57] ABSTRACT

An apparatus for sensing changes in liquid level in a reservoir and adjusting flow of liquid into the reservoir to maintain the level at a selected height, the apparatus including a base member, a liquid conduit mounted on the base member, an arm hingedly mounted on the base member proximate a delivery end of the conduit, a stopper fixed to the arm and arcuately moveable into and out of engagement with the conduit delivery end, and a flotation body fixed to a free end of the arm and adapted to be engaged by the liquid in the reservoir.

2 Claims, 5 Drawing Figures

LIQUID LEVEL ACTUATOR

BACKGROUND OF THE INVENTION

1. Field of the Invention

This invention relates to liquid level maintaining devices and is directed more particularly to a device for automatically adjusting the delivery of liquid into a liquid retaining reservoir to maintain the level of the liquid at a desired height.

2. Description of the Prior Art

Devices of this general type are known in the art and are generally used in connection with swimming pools, animal watering troughs, liquid fuel systems, tide gates, and the like. Such devices are, by and large, built into the reservoir system and require expensive construction and/or modification of the reservoir if added after the reservoir is in place.

SUMMARY OF THE INVENTION

An object of the present invention is to provide a self-contained liquid level maintaining apparatus which is of inexpensive construction and may simply and easily be used in conjunction with an existing liquid reservoir, without the necessity of effecting structural modifications to the reservoir.

With the above and other objects in view, as will hereinafter appear, a feature of the present invention is the provision of an apparatus for sensing changes in liquid level in a reservoir and adjusting flow of liquid into the reservoir to maintain the level at a selected height, the apparatus comprising a base member adapted for connection to a wall of the reservoir, a vertical conduit member connected to the base member, a connector portion disposed at an upper end of the conduit member and adapted to receive a liquid delivery hose, a lower end of the conduit member comprising an outlet for flow of liquid therefrom into the reservoir, an arm hingedly mounted on the base member proximate the conduit member lower end, a stopper fixed to the arm and arcuately movable between a first position, in which the stopper is adjacent the outlet and partially disposed within the outlet, whereby to close the conduit member outlet, and a second position in which the stopper is removed from the conduit member outlet and removed from a vertical axis of the conduit member, and a flotation body fixed to a free end of the arm and adapted to be engaged by the surface of the liquid in the reservoir.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention from which its novel features and advantages will be apparent.

In the drawings.

DESCRIPTION OF THE PREFERRED EMBODIMENTS

Figure 1:
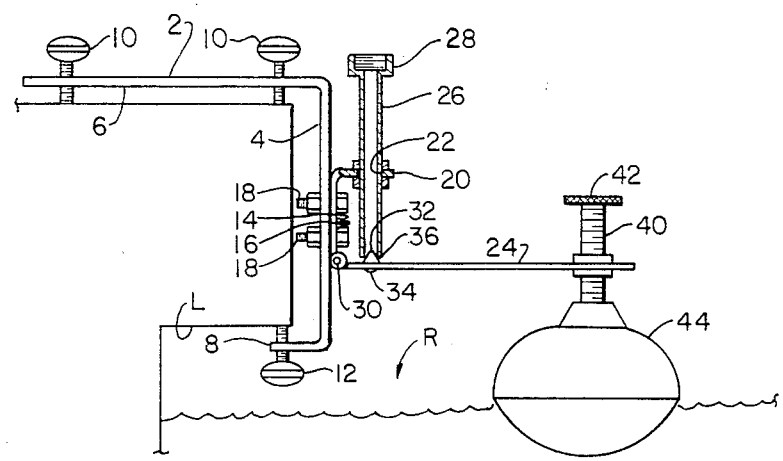
FIG. 1 is a side elevational, partly sectional, view of one form of liquid level actuator, illustrative of an embodiment of the invention, and showing an arm portion in a first position.
Figure 2:
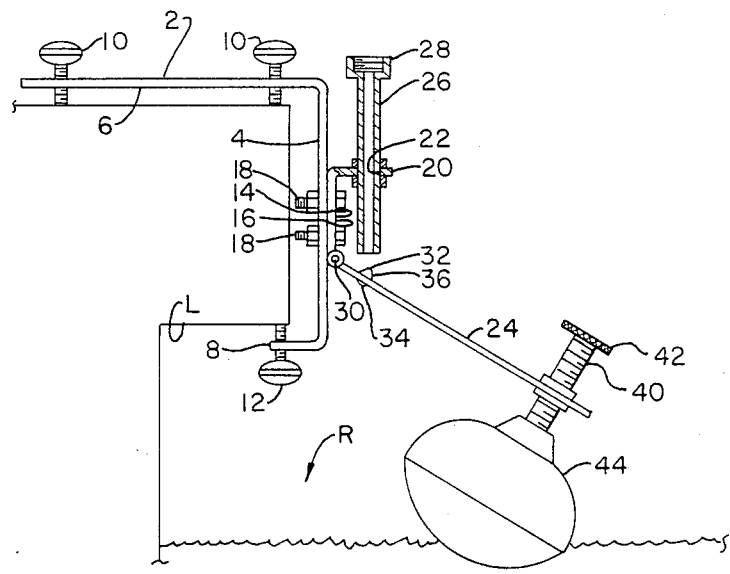
FIG. 2 is a side elevational view thereof, showing the arm portion in a second position.
Figure 3:
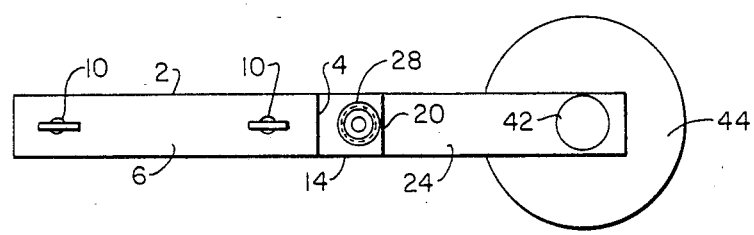
FIG. 3 is a top plan view thereof.

Referring to FIGS. 1–3, it will be seen that the illustrative apparatus includes a base member 2, which may, as illustrated, comprise a generally U-shaped bracket having a base portion 4 and an upper leg 6 and a lower leg portion 8, each of the leg portions being provided with threaded holes having upper and lower wing-nuts 10, 12 disposed therein.

Fixed to the base portion 4 of the base member 2 is an L-shaped bracket 14 having a wall portion 16 adjacent the base member base portion 4 by screws 18, or the like. Fixed rigidly to, and extending outwardly from, the upper end of the wall portion 16 is a retaining plate 20 having a hole 22 therethrough. Hingedly connected to the lower end of the bracket 14 is a pivotally moveable arm 24.

The retaining plate 20 is adapted to retain, in the hole 22 thereof, a vertically disposed conduit member 26. At an upper end of the conduit member 26, there is provided a connector portion 28 adapted to threadedly receive and retain a liquid delivery hose, which for most purposes may be an ordinary garden hose (not shown). A lower end of the conduit member 26 comprises an outlet for delivery of liquid into a reservoir R.

A hinge 30 interconnecting the bracket 14 and pivotally moveable arm 24 is disposed proximate the conduit member lower end. Fixed to the arm 24, near the hinge 30, is a stopper 32. The stopper 32 is preferably fixed to the arm 24 by a centrally disposed screw 34, by which the stopper easily may be removed and replaced. The stopper is preferably of rubber or a rubber-like composition.

The stopper 32 is provided with a frusto-conically shaped wall portion 36 which has a diameter in excess of the diameter of the conduit member outlet.

The arm 24 has near its free end a threaded spindle 40, preferably provided with a knob 42 at its upper end. At a lower end of the spindle, there is provided a flotation body 44.

In operation, the base member 2 is fixed to a lip portion L (FIG. 1) of the reservoir R, which may be a swimming pool, or the like. By use of the wing nuts 10, 12, the base member 2 may be securely attached to the lip portion L of the pool R. A garden hose may then be threadedly connected to the connector portion 28 of the conduit member 26.

Activation of the liquid supply, water for example for a swimming pool, will cause water to flow through the conduit member 26, out its lower end and into the reservoir, or pool R. Water will continue to flow until the rising surface of the water forces the flotation body 44 upwardly, pivoting the arm 24 upon the hinge 30, thereby moving the stopper 32 through an arcuate path and into engagement with the conduit member outlet.

As engagement between the stopper 32 and the conduit member outlet, becomes firm, a central portion of the stopper enters the conduit member and the frusto-conical wall portion 36 of the stopper engages the annular edge of the conduit outlet, the rubbery substance of the stopper effectively sealing the outlet. When, through evaporation or the like, the water level descends slightly, the flotation body drops slightly, easing the contact between the stopper 32 and the outlet, permitting water to escape along the frusto-conical wall 36. If the water level drops substantially, the stopper will descend through an arcuate path to a point out of alignment with, and eventually removed from, the axis of the conduit, permitting fullstream flow from the conduit to the reservoir R.

If it is desired to change the level of water, by manipulation of the knob 42, an operator may adjust the position of the flotation body 44, thereby to alter the level at which the apparatus will stop the delivery of water.

Figure 4:
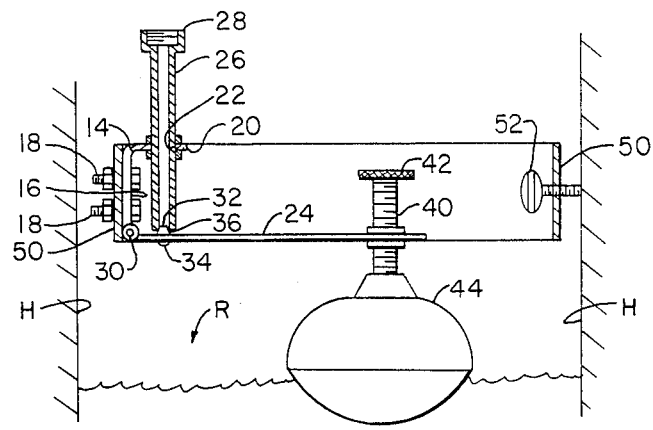
FIG. 4 is a side elevational and partly sectional view of another form of liquid level actuator, illustrative of an alternative embodiment of the invention.
Figure 5:
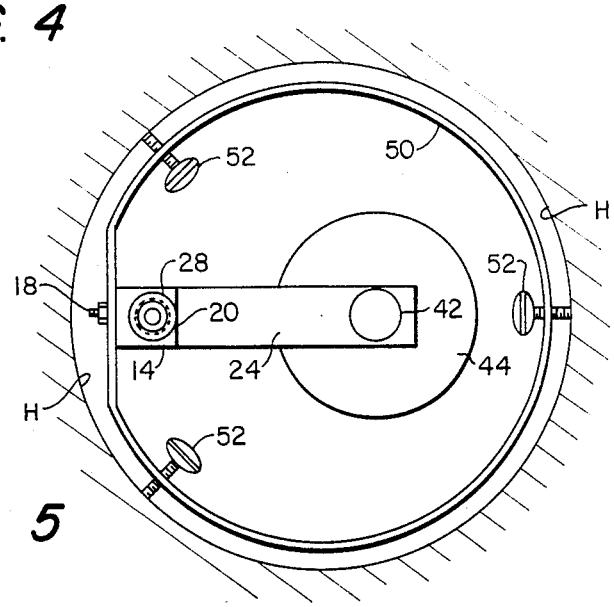
FIG. 5 is a top plan view of the alternative embodiment of FIG. 4.

An alternative embodiment shown in FIGS. 4 and 5 operates as set forth above and is constructed as above described, except that the base member 50 is circular in configuration and is provided with outwardly-directed wing nuts 52. In the construction of in-ground swimming pools, it is common practice to provide a small water chamber close by the main reservoir and which is in communication therewith, the chamber being typically accessible by way of a round hole H, for taking of water samples, placement of water hoses, and the like. The water level in the access chamber rises and falls with the water level in the main reservoir. For such pools, it may be more convenient to place the instant apparatus in such hole, away from the lip of the pool. For such purpose, there is provided the circular base member 50, which by use of the wing-nuts 52, may be fixed to the interior of the access hole H and provide the same function as above described by reaction to the water level in the access chamber.

Thus, there is provided an inexpensive apparatus adapted for use with previously constructed reservoirs, requiring no structural modification of the reservoirs.

It is to be understood that the present invention is by no means limited to the particular construction herein disclosed and/or shown in the drawings, but also comprises any modifications or equivalents within the scope of the disclosure.

Having thus described my invention what I claim as new and desire to secure by Letters Patent of the United States is:

1. An apparatus for sensing changes in liquid level in a reservoir and adjusting flow of liquid into said reservoir to maintain said level at a selected height, said apparatus comprising a base member adapted for connection to a lip portion of a wall of said reservoir, said base member comprising a generally U-shaped member having a base portion, an upper leg portion, and a lower leg portion, each of said leg portions being provided with threaded holes, upper and lower screws disposed, respectively, in said upper and lower leg portions and extending toward upper and lower surfaces, respectively, of said lip portion to connect said base member to said lip portion, a bracket fixed to said U-shaped member, said bracket comprising a wall portion adjacent said base member base portion and a retaining portion extending outwardly from said wall portion and having an opening therethrough, a vertical conduit member disposed in said retaining portion opening and being retained therein, a connector portion disposed at an upper end of said conduit member and adapted to receive a liquid delivery hose, a lower end of said conduit member comprising an outlet for flow of liquid therefrom into said reservoir, an arm hingedly mounted on said bracket proximate said conduit member lower end, a stopper fixed to said arm and arcuately moveable between a first position in which said stopper is adjacent said outlet and partially disposed within said outlet, whereby to close said conduit member outlet, and a second position in which said stopper is removed from said conduit member outlet, and a flotation body fixed to a free end of said arm and adapted to be engaged by the surface of said liquid in said reservoir, and further adapted to move arcuately to a position beneath the lower surface of said lip and a lower surface of said base member lower leg portion, said arm being moveable between a first portion in which said arm is substantially horizontal to a second position in which said arm is substantially vertical.

2. An apparatus for sensing changes in liquid level in a reservoir and adjusting flow of liquid into said reservoir to maintain said level at a selected height, said apparatus comprising a base member adapted for connection to interior walls of said reservoir, said base member comprising a rigid, substantially circular collar member having threaded holes therein, screws disposed in said holes and directed outwardly to impinge upon said interior walls of said reservoir to fix said collar member in said reservoir, a bracket fixed to said collar member, said bracket comprising a wall portion adjacent said collar member and a retaining portion extending inwardly from said collar member and having an opening therethrough, a vertical conduit member disposed in said retaining portion opening and being retained therein, a connector portion disposed at an upper end of said conduit member and adapted to receive a liquid delivery hose, a lower end of said conduit member comprising an outlet for flow of liquid therefrom into said reservoir, an arm hingedly mounted on said bracket proximate said conduit member lower end and extending inwardly of said collar member, a stopper fixed to said arm and arcuately moveable between a first position in which said stopper is adjacent said outlet and partially disposed within said outlet, whereby to close said conduit member outlet, and a second position in which said stopper is removed from said conduit member outlet, and a flotation body fixed to a spindle mounted on a free end of said arm, said flotation body being disposed beneath said collar member, said flotation body being adapted to be engaged by the surface of said liquid in said reservoir, and further adapted to move arcuately between a position inward of said interior walls of said reservoir and a position adjacent one of said interior walls of said reservoir.

* * * * *